US008544724B2

(12) United States Patent
Gilbert et al.

(10) Patent No.: US 8,544,724 B2
(45) Date of Patent: Oct. 1, 2013

(54) SYSTEMS AND METHODS FOR ASSOCIATING A MOBILE ELECTRONIC DEVICE WITH A PREEXISTING SUBSCRIBER ACCOUNT (75) Inventors: Raymond Gilbert, Lansdale, PA (US); Brian D. Korty, Chesterbrook, PA (US)

(73) Assignee: SeaChange International, Inc., Acton, MA (US)

( * ) Notice: Subject to any disclaimer, the term of this patent is extended or adjusted under 35 U.S.C. 154(b) by 0 days.

(21) Appl. No.: 13/345,488

(22) Filed: Jan. 6, 2012

(65) Prior Publication Data

US 2013/0175333 A1 Jul. 11, 2013

(51) Int. Cl.
*G06F 17/00* (2006.01)

(52) U.S. Cl.
USPC ........................................................ 235/375

(58) Field of Classification Search
USPC ..... 235/375, 462.01, 462.09, 472.01–472.03; 455/420
See application file for complete search history.

(56) References Cited

U.S. PATENT DOCUMENTS

| 8,150,387 B2* | 4/2012 | Klein et al. ................... 455/420 |
| 2005/0139674 A1 | 6/2005 | Ishibashi et al. |
| 2006/0262328 A1 | 11/2006 | Nose et al. |
| 2007/0130592 A1 | 6/2007 | Haeusel |
| 2008/0134278 A1* | 6/2008 | Al-Karmi ...................... 725/141 |
| 2008/0254742 A1 | 10/2008 | Trappeniers et al. |
| 2009/0165053 A1 | 6/2009 | Thyagarajan et al. |
| 2010/0071007 A1 | 3/2010 | Meijer |
| 2010/0081375 A1* | 4/2010 | Rosenblatt et al. .......... 455/41.1 |
| 2010/0154035 A1 | 6/2010 | Damola et al. |
| 2010/0315200 A1 | 12/2010 | Warrier |

* cited by examiner

*Primary Examiner* — Seung Lee
(74) *Attorney, Agent, or Firm* — Proskauer Rose, LLP (57) ABSTRACT A method for associating a mobile electronic device with a preexisting subscriber account includes capturing a matrix barcode image presented on a display by a first device. The matrix barcode image is encoded with first device identification data that identifies the first device. The first device identification data is associated with a preexisting subscriber account stored in a subscriber database. The method further includes extracting the first device identification data from the matrix barcode image, and obtaining mobile device identification data that identifies a mobile electronic device. The method further includes transmitting a message to a device manager server, the message including the first device identification data, the mobile device identification data and a request to associate the mobile device identification data with the preexisting subscriber account associated with the first device identification data.

20 Claims, 5 Drawing Sheets

SYSTEMS AND METHODS FOR ASSOCIATING A MOBILE ELECTRONIC DEVICE WITH A PREEXISTING SUBSCRIBER ACCOUNT

TECHNICAL FIELD

Embodiments of the present invention generally relate to systems and methods for associating mobile electronic devices with preexisting subscriber accounts, and more particularly, to systems, methods and computer readable program products for associating mobile electronic devices with preexisting subscriber accounts using matrix barcode images.

BACKGROUND

As mobile electronic devices, such as mobile phones and tablet computers, become increasingly popular, digital media services have launched mobile applications that allow subscribers to remotely access subscriber features and services. For example, some cable television providers have launched mobile applications that allow subscribers to remotely view TV shows and movies on their mobile electronic devices. In addition, some mobile applications allow subscribers to schedule DVR recordings directly from a user's mobile electronic device.

Associating a subscriber's mobile electronic device with a subscriber's account for a DVR system requires manually inputting values for various subscriber parameters, such as account information and device identification data. Furthermore, subscribers having two or more DVR systems can be required to manually identify each DVR system during an initial setup procedure. However, manual entry of subscriber parameters and other system information can lead to errors, resulting in subscriber frustration and a poor user experience.

SUMMARY

Embodiments of the present inventive concepts are directed in part to systems, methods and computer readable program products for associating mobile electronic devices with preexisting subscriber accounts using matrix barcode images. For example, the systems, methods and computer readable program products disclosed herein allow a subscriber of digital media services to associate a mobile electronic device with a subscriber's account without manually inputting values for various subscriber parameters into the mobile electronic device or the media services systems. The mobile electronic device can be associated with the subscriber's account by capturing a matrix barcode image encoded with identification data. After associating the mobile electronic device, the subscriber can access services connected with the subscriber's account and/or control other devices associated with the subscriber's account.

In one aspect, a computerized method for associating a mobile electronic device with a preexisting subscriber account comprises capturing, by a mobile electronic device, a matrix barcode image presented on a display by a first device. The matrix barcode image is encoded with first device identification data that identifies the first device. The first device identification data is associated with a preexisting subscriber account stored in a subscriber database. The method further comprises extracting, by the mobile electronic device, the first device identification data from the matrix barcode image, and obtaining, by the mobile electronic device, mobile device identification data that identifies the mobile electronic device. The method further comprises transmitting a message, by the mobile electronic device, to a device manager server. The message includes the first device identification data, the mobile device identification data and a request to associate the mobile device identification data with the preexisting subscriber account associated with the first device identification data.

In some embodiments, the matrix barcode image is further encoded with a uniform resource locator (URL) identifying web services of the device manager server. The method further comprises extracting, by the mobile electronic device, the first device identification data and the URL from the matrix barcode image, and transmitting the message, by the mobile electronic device, to the web services of the device manage server at the URL extracted from the matrix barcode image.

In some embodiments, the device manager server is configured to update the subscriber database. The method further comprises receiving, by the device manager server, the message transmitted by the mobile electronic device, and searching the subscriber database for the preexisting subscriber account associated with the first device identification data, and updating the preexisting subscriber account to include the mobile device identification data.

In some embodiments, the matrix barcode image is further encoded with subscriber account information.

In some embodiments, the first device is a set top box connected to the display.

In some embodiments, the first device is an internet-connected television.

In some embodiments, the first device is a mobile computer device having an integrated display.

In some embodiments, the mobile electronic device includes one selected from the group consisting of: a mobile phone, a portable media player, a tablet computer, and a personal digital assistant.

In some embodiments, the first device identification data includes at least one selected from the group consisting of: a MAC address of the first device, an IP address of the first device, a serial number of the first device, and a geographic location of the first device.

In some embodiments, the mobile device identification data includes at least one selected from the group consisting of: a MAC address, a network address, an electronic serial number (ESN), an international mobile equipment identity (IMEI) number, a globally unique identifier (GUID), and a telephone number.

In another aspect, a non-transitory computer readable media comprises computer executable instructions for performing a method for associating a mobile electronic device with a preexisting subscriber account. The instructions are executable to cause the mobile electronic device to capture a matrix barcode image presented on a display by a first device. The matrix barcode image is encoded with first device identification data that identifies the first device. The first device identification data is associated with a preexisting subscriber account stored in a subscriber database. The instructions are executable to cause the mobile electronic device to extract the first device identification data from the matrix barcode image, and to obtain mobile device identification data that identifies the mobile electronic device. The instructions are executable to cause the mobile electronic device to transmit a message to a device manager server, the message including the first device identification data, the mobile device identification data and a request to associate the mobile device identification data with the preexisting subscriber account associated with the first device identification data.

In some embodiments, the matrix barcode image is further encoded with a uniform resource locator (URL) identifying web services of the device manager server. The non-transitory computer readable media further comprises executable instructions to cause the mobile electronic device to extract the first device identification data and the URL from the matrix barcode image, and to transmit the message to the web services of the device manage server at the URL extracted from the matrix barcode image.

In some embodiments, the first device is a set top box connected to the display.

In some embodiments, the first device is an internet-connected television.

In some embodiments, the first device is a mobile computer device having an integrated display.

In some embodiments, the mobile electronic device includes one selected from the group consisting of: a mobile phone, a portable media player, a tablet computer, and a personal digital assistant.

In some embodiments, the first device identification data includes at least one selected from the group consisting of: a MAC address of the first device, an IP address of the first device, a serial number of the first device, and a geographic location of the first device.

In some embodiments, the mobile device identification data includes at least one selected from the group consisting of: a MAC address, an network address, an electronic serial number (ESN), an international mobile equipment identity (IMEI) number, a globally unique identifier (GUID), and a telephone number.

In another aspect, a computerized method for associating a mobile electronic device with a preexisting subscriber account comprises providing access to a non-transitory computer readable media including computer executable instructions for performing a method for associating a mobile electronic device with a preexisting subscriber account. The instructions are executable to cause the mobile electronic device to capture a matrix barcode image presented on a display by a first device. The matrix barcode image is encoded with first device identification data that identifies the first device. The first device identification data is associated with a preexisting subscriber account stored in a subscriber database. The instructions are executable to cause the mobile electronic device to extract the first device identification data from the matrix barcode image, and to obtain mobile device identification data that identifies the mobile electronic device. The instructions are executable to cause the mobile electronic device to transmit a message to a device manager server. The message includes the first device identification data, the mobile device identification data and a request to associate the mobile device identification data with the preexisting subscriber account associated with the first device identification data. The method comprises loading the executable instructions on to the mobile electronic device.

In another aspect, a mobile electronic device comprises an image capture device configured to capture a matrix barcode image presented on a display by a first device. The matrix barcode image is encoded with first device identification data that identifies the first device. The first device identification data is associated with a preexisting subscriber account stored in a service provider database. The mobile electronic device further comprises a processor in communication with the image capture device. The processor is configured to extract the first device identification data from the matrix barcode image, obtain mobile device identification data that identifies the mobile electronic device, and transmit a message to a device manager server. The message includes the first device identification data, the mobile device identification data and a request to associate the mobile device identification data with the preexisting subscriber account associated with the first device identification data.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION

Figure 1:
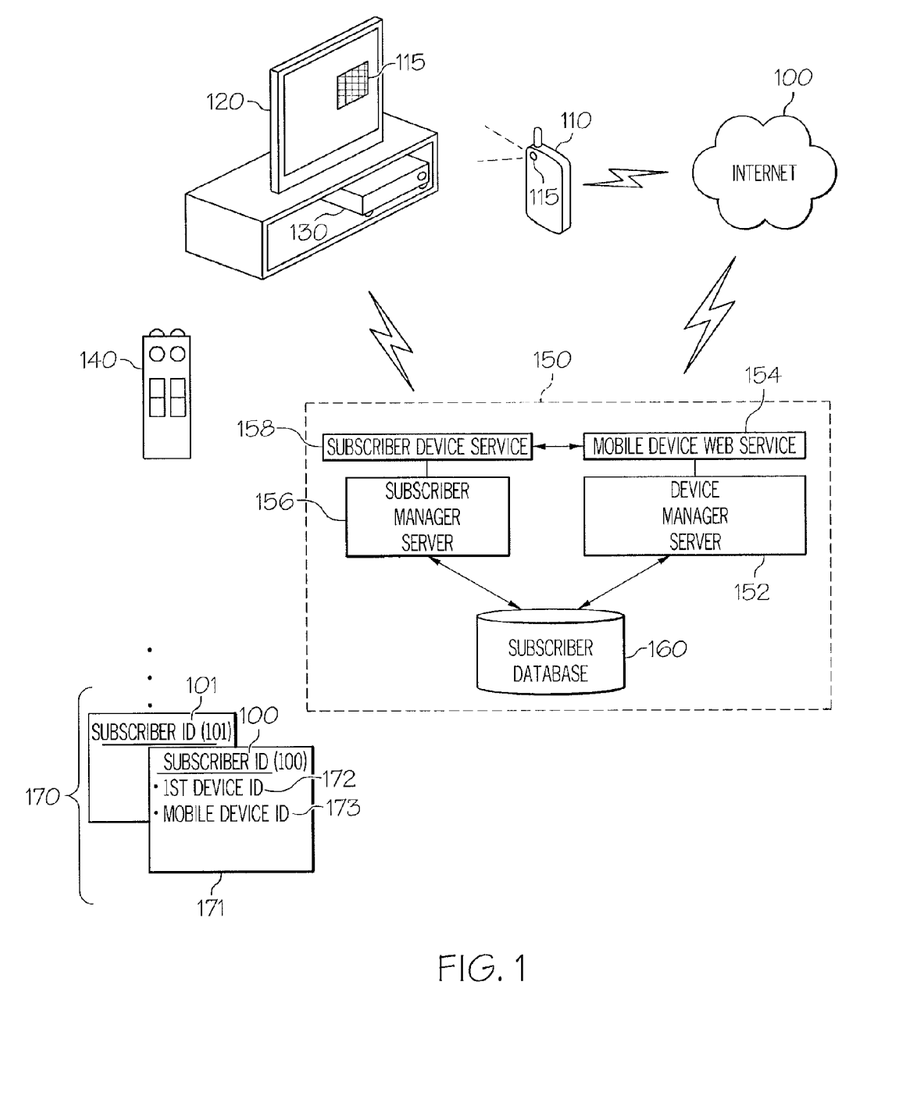
FIG. 1 is a diagram illustrating an architecture for associating a mobile electronic device with a preexisting subscriber account using a matrix barcode image, according to embodiments of the present invention.

FIG. 1 is a diagram illustrating an architecture for associating a mobile electronic device with a preexisting subscriber account using a matrix barcode image, according to embodiments of the present invention. A subscriber of digital media services, such as cable television services, satellite television services, IPTV services and other types of video-on-demand (VOD) and audio-based subscription services, can associate a mobile electronic device 110 with a subscriber's account of a digital media service by capturing a matrix barcode image 115 encoded with identification data. In this manner, the subscriber can associate the mobile electronic device 110 with the subscriber's account without manually inputting values for various subscriber parameters, such as service account data and/or device identification data. After associating the mobile electronic device 110 using the matrix barcode image 115, a subscriber can access services connected with the subscriber's account or control other devices associated with the subscriber's account using the mobile electronic device 110.

The architecture of FIG. 1 includes a mobile electronic device 110, a display device 120, a first device 130, a standalone remote control device 140, and a media services system 150. The mobile electronic device 110 can be connected to the Internet 100 via WIFI or cellular service, and can be configured to communicate with the media services system 150. The first device 130 includes, in some embodiments, a cable or satellite television set-top box (STB). However, in other embodiments the first device 130 includes an internet-connected television having an integrated display device, an internet-connected optical disk player, a computer, an IPTV player or a mobile computing device having an integrated display. The first device 130 can be connected to the Internet 100 and/or a closed network of the media service, and can be configured to communicate with the media services system 150.

In the exemplary architecture of FIG. 1, the first device 130 is shown installed at a subscriber location. In this embodiment, the first device 130 is associated with a preexisting subscriber account 171 of a digital media service, and is configured to output media, such as broadcast television and VOD assets to the display device 120. A standalone remote control device 140 can be provided to allow a subscriber to control various functions of the display device 120 and the first device 130, such as, channel tuning, volume control, electronic program guide access, digital video recorder access and VOD access. The standalone remote control device 140 can also allow a subscriber to initiate a process for associating the mobile electronic device 110 with the preexisting subscriber account 171 and/or the first device 130, which will be described in further detail with respect to FIGS. 2 and 5.

The media services system 150 includes a device manager server 152 having a mobile device web service 154, a subscriber manager server 156 having a subscriber device service 158 and a subscriber database 160 storing a plurality of subscriber accounts 170. The media services system 150 is configured to associate the mobile electronic device 110 with the subscriber's account 171 and optionally link the mobile electronic device 110 with a device that was previously associated with the subscriber's account. For example, the preexisting subscriber account 171 is shown associated with the first device 130, which is represented by a unique device identification parameter 172 in the subscriber's account. Following an associating process, the mobile electronic device 130 is associated with the subscriber's account 171, which is represented by a unique mobile device identification parameter 173 in the subscriber's account. In this manner, the subscriber can access services connected with the subscriber's account, such as broadcast programming, VOD services and DVR services, or control functions of the first device 130, such as channel tuning, volume control, electronic program guide access, digital video recorder access and VOD access, associated with the subscriber's account using the mobile electronic device 110. For subscriber accounts 170 including a plurality of first devices 130, the mobile electronic device 110 can be linked to a particular first device 130 so that the user of the mobile electronic device 110 can control features and functions of the particular first device 130.

The device manager server 152 includes a mobile device web service 154 that is configured to communicate with the mobile electronic device 110 through the Internet 100. The mobile device web service 154 is configured to receive/transmit messages from/to the mobile electronic device 110 and relay the messages to the device manager server 152 and/or the subscriber manager server 156 for processing.

The subscriber manager server 156 includes a subscriber device service 158 that is configured to communicate with the first device 130 through the Internet 100 and/or a closed network of the media service. The subscriber device service 158 is configured to receive/transmit messages from/to the first device 130 and relay the messages to the subscriber manager server 156 and/or the device manager server 152 for processing.

The mobile electronic device 110 can include a mobile phone, a portable media player, a tablet computer, or a personal digital assistant. For example, the electronic device 110 can include an iPhone or iPad by Apple of Cupertino, Calif., USA. The mobile electronic device 110 includes an image capture device 115 capable of capturing at least one image of the matrix barcode 115. The matrix barcode image 115 can include a quick response code, a high capacity color barcode, a barcode or other type of matrix barcode image.

The digital media service can include cable television service such as Xfinity® TV by Comcast Corporation of Philadelphia, Pa., USA, satellite television service such as Choice™ television service by DirectTV of El Segundo, Calif., USA, and IPTV service such as streaming services by Netflix, Inc. of Los Gatos, Calif., USA. The digital media service can also include an audio service such as Pandora® Radio by Pandora Media, Inc. of Oakland, Calif., USA.

The methods and processes disclosed herein can be implemented by the above systems and devices, or equivalent systems and devices, executing a unique set of instructions stored or embodied in computer readable media. As will be appreciated by those skilled in the art, a unique set of instructions can be implemented or embodied as executable code, such as, software, firmware, machine code or a combination thereof. As such, the unique set of instructions stored or embodied in the computer readable media transforms the above systems and devices into particular, special purpose systems and devices that can operate, for example, according to the following exemplary sequence diagrams. In some embodiments, unique sets of instructions correspond to the methods and processes disclosed in FIGS. 2 and 5 and described below in further detail.

Figure 2:
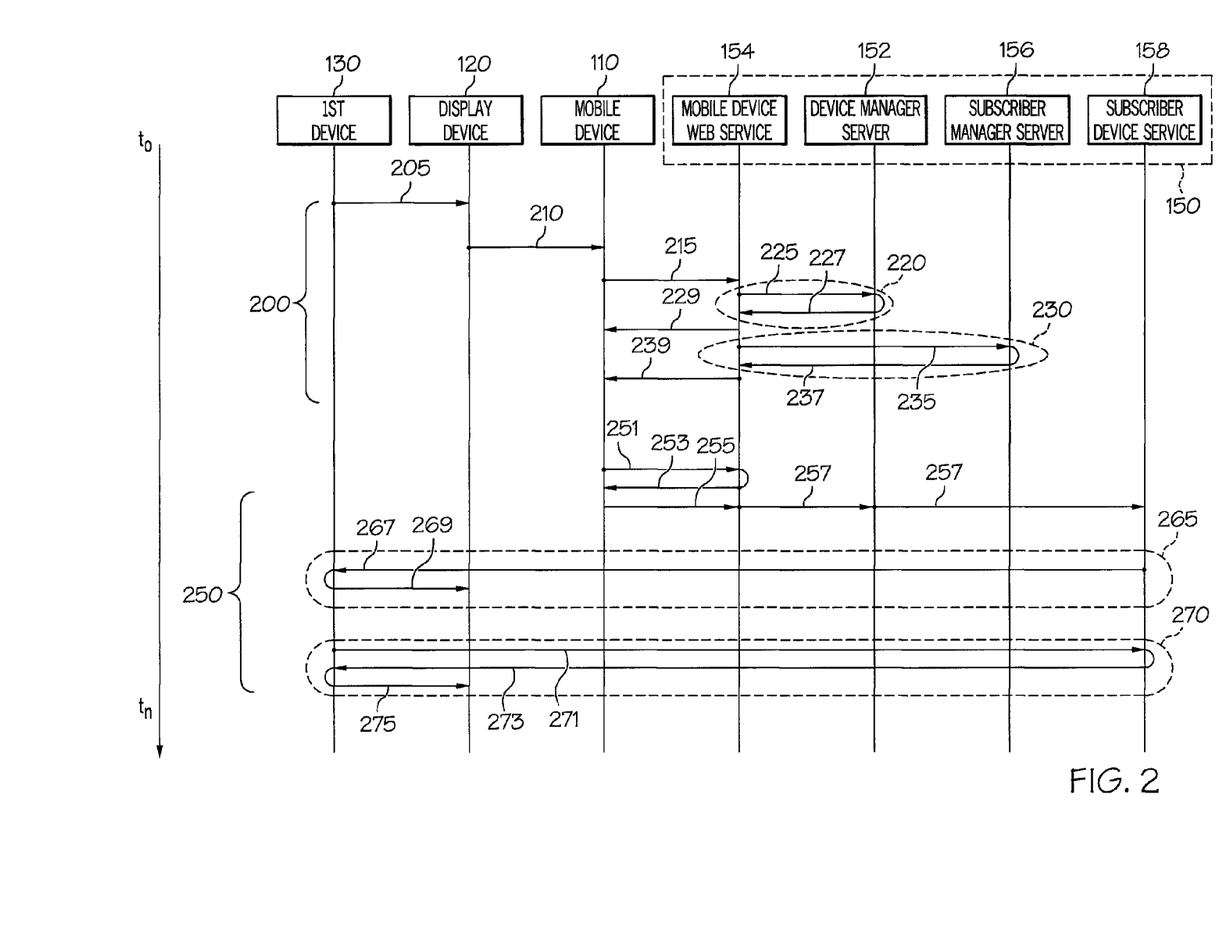
FIG. 2 is a sequence diagram that illustrates a method for associating a mobile electronic device with a preexisting subscriber account using a matrix barcode image, according to embodiments of the present invention.

FIG. 2 is a sequence diagram that illustrates a method for associating a mobile electronic device with a preexisting subscriber account using a matrix barcode image, according to embodiments of the present invention. As described above, a subscriber can associate a mobile electronic device 110 with the subscriber's account without manually inputting values for various subscriber parameters. After associating the mobile electronic device 110, the subscriber can access services connected with the subscriber's account or control other devices associated with the subscriber's account using the mobile electronic device 110.

The sequence diagram of FIG. 2 illustrates an exemplary method for associating the mobile electronic device 110 with the subscriber's account (200). The sequence diagram of FIG. 2 also illustrates an exemplary method for selecting or bookmarking a broadcast channel or a VOD asset on the mobile electronic device 110 for viewing at a later time using the first device 130 (250).

Prior to associating the mobile electronic device 110 (200), the subscriber or user can load a program on the mobile electronic device 110 in the form of executable instructions. This can include, for example, downloading a mobile application from an online application store to memory of the mobile electronic device 110. The executable instructions can cause the mobile electronic device 110 to perform the methods and processes described in connection with the sequence diagram of FIG. 2.

To initiate the process (200) for associating a mobile electronic device 110 with a preexisting subscriber account, a subscriber can request, at the first device 130, to associate the portable electronic device 110 with the preexisting subscriber account currently associated with the first device 130. For example, the subscriber can initiate the process (200) by navigating an electronic program guide displayed on the display device 120 by the first device 130 with the standalone remote control device 140.

Upon receiving a request to initiate the process (200), the first device 130 presents a matrix barcode encoded with first device identification data on the display device 120 (205). The first device identification data identifies the first device 130, and can include at least one of a MAC address of the first device, an IP address of the first device, a serial number of the first device, a geographic location of the first device or other unique identifier of the first device. Alternatively or additionally, the matrix barcode can be encoded with subscriber account information, such as an account id or account credentials, that corresponds to the subscriber account currently associated with the first device 130. This information can be provided to the media services system 150 to associate the first device 130 with the subscriber's account, and can be used by the media service system 150 to link the mobile electronic device 110 with a particular first device 130.

In some embodiments, the first device 130 is configured to generate the matrix barcode locally. However, in other embodiments, the matrix barcode is generated remote from the first device 130. For example, the matrix barcode can be generated at the device manager server 152 or the subscriber manger server 156 of the media services system 150, and can be transmitted to the first device 130 for display.

Following the display of the matrix barcode (205), the subscriber captures an image of the matrix barcode displayed on the display device 120 with the mobile electronic device 110 (210), which extracts the first device identification data and/or subscriber account information from the matrix barcode image (210). The mobile electronic device 110 also obtains mobile device identification data from its systems for identification of the mobile electronic device 110. The mobile device identification data can include at least one of a MAC address of the mobile electronic device, a network address of the mobile electronic device, an electronic serial number (ESN) of the mobile electronic device, an international mobile equipment identity (IMEI) number of the mobile electronic device, a globally unique identifier (GUID) of the mobile electronic device, a telephone number of the mobile electronic device or other unique identifier of the mobile electronic device.

After the extracting and obtaining processes, the mobile electronic device 110 transmits a message including the first device identification data, the mobile device identification data and a request to associate the mobile electronic device 110 with the preexisting subscriber account previously associated with the first device 130 to the media services system 150 (215). The message can also include subscriber account information or other information extracted from the matrix barcode. Additionally, the message can include a request to link the mobile electronic device 110 with a particular first device 130.

For example, the mobile electronic device 110 can be configured to transmit the message to the mobile device web service 154 of the device manager server 152 (215). In some embodiments, the matrix barcode image is encoded with a uniform resource locator (URL) that identifies the mobile device web service 154. However, in other embodiments, the program loaded on the mobile electronic device 110 includes the URL that identifies the mobile device web service 154.

Referring to FIGS. 1 and 2, the mobile device web service 154 can relay the message to the device manager server 152 or to the subscriber manager server 156 for processing. For example, in a first implementation (220) the mobile device web service 154 relays the message to the device manager server 152 (225), which searches the subscriber database 160 for the preexisting subscriber account 171 associated with the first device identification data 172 included in the message. Upon finding the preexisting subscriber account 171 associated with the first device identification data 172, the device manager server 152 updates the preexisting subscriber account 171 to include the mobile device identification data 173. Alternatively or additionally, the device manager server 152 searches the subscriber database 160 for the preexisting subscriber account 171 matching the subscriber account information included in the message. The device manager server 154 updates the preexisting subscriber account 171 to include the mobile device identification data 173 and optionally links the mobile device identification data 173 with the first device identification data 172. After updating the subscriber account, the device manager server 154 can transmit a confirmation message to the mobile electronic device 110 via the mobile device web service 154 (227, 229).

In a second implementation (230), the mobile device web service 154 relays the message to the subscriber manager server 156 (235), for example, via the subscriber device service 158. The subscriber manager server 156 searches the subscriber database 160 for the preexisting subscriber account 171 associated with the first device identification data 172 included in the message. Upon finding the preexisting subscriber account 171 associated with the first device identification data 172, the subscriber manager server 156 updates the preexisting subscriber account 171 to include the mobile device identification data 173. Alternatively or additionally, the subscriber manager server 156 searches the subscriber database 160 for the preexisting subscriber account 171 matching the subscriber account information included in the message. The subscriber manager server 156 updates the preexisting subscriber account 171 to include the mobile device identification data 173 and optionally links the mobile device identification data 173 with the first device identification data 172. After updating the subscriber account, the subscriber manager server 156 can transmit a confirmation message to the mobile electronic device 110 via the mobile device web service 154 (237, 239).

Referring to FIG. 1, while both the device manager server 152 and the subscriber manager server 156 are shown having access to the subscriber database 160, a single one of the subscriber manager and the device manager server 156 can have access to the subscriber database 160. Alternatively, both the device manager server 152 and the subscriber manager server 156 can include separate subscriber databases 160.

Referring back to FIG. 2, a subscriber or user of the mobile electronic device 110 can select or bookmark a broadcast channel or VOD asset on the mobile electronic device 110 for viewing at a later time using the first device 130 (250). After associating the mobile electronic device (200), the subscriber or user instructs the mobile electronic device 110 to request a listing of available broadcast channels or VOD assets from the media services system 150. For example, the mobile electronic device 110 transmits a message including the request to the mobile device web service 154 of the device manager server 152 (251). The mobile device web service 154 relays the message to the device manager server 152 and/or the subscriber manager server 156 for authentication and processing. Following authentication and processing, the mobile device web service 154 transmits a response message including a listing of broadcast channels or VOD assets available to the subscriber account associated with the mobile electronic device 110 (253).

Figure 3:
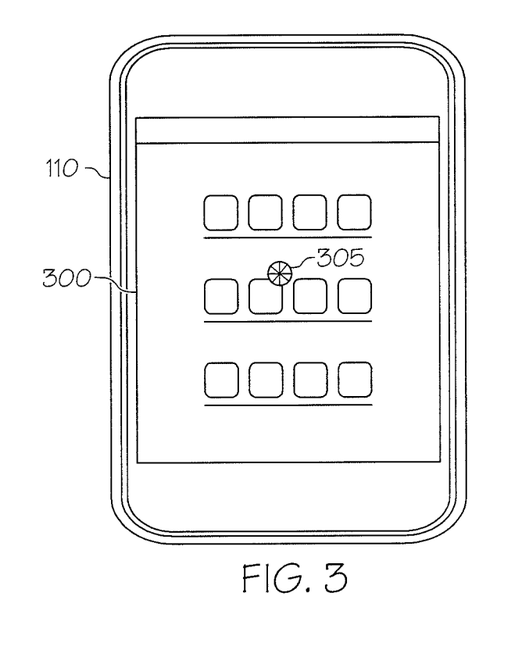
FIG. 3 is a front view of a mobile electronic device, according to embodiments of the present invention.

FIG. 3 is a front view of a mobile electronic device, according to embodiments of the present invention. The mobile electronic device 110 is shown displaying a listing of VOD assets 300 available to the subscriber account associated with the mobile electronic device 110. The subscriber or user of the mobile electronic device 110 can select or bookmark one or more of the displayed VOD assets 300 for viewing at a later time on the first device 130. In the present exemplary embodiment, a VOD asset 305 is shown selected on the mobile electronic device 110. Accordingly, the subscriber or user of the mobile electronic device 110 can view the listing of VOD assets remote from the installation location of the first device 130.

Referring back to FIG. 2, the mobile electronic device 110 transmits a message including selection data corresponding to the selected or bookmarked broadcast channel or VOD asset to the mobile device web service 154 (255), which can relay the message to the device manager server 152 and/or the subscriber manager server 156 (257) for processing. The device manager server 152 or the subscriber manager server 156 can update the subscriber account associated with the mobile electronic device 110 to include the selection data. After the selection data has been received by the media services system 150, the subscriber device service 158 can push (265) the selection data to the first device 110 or the first device 110 can fetch (270) the selection data from the subscriber device service 158.

For example, in the push process (265), the subscriber device service 158 transmits a message including the selection data to the first device 130 (267), which displays the selected or bookmarked broadcast channel or VOD asset on the display device 120 (269). In the fetch process (270), the first device 130 requests the selection data from the subscriber device service 158 (271). In response, the subscriber device service 158 transmits a message including the selection data to the first device 130 (273), which can display the selected or bookmarked broadcast channel or VOD asset on the display device 120 (274).

Figure 4:
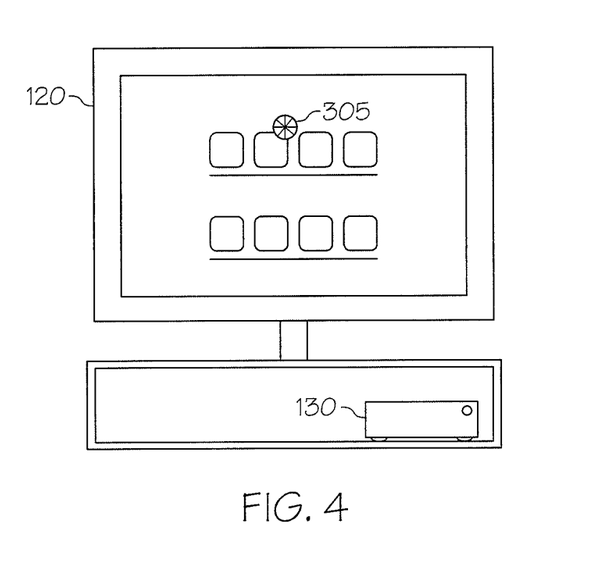
FIG. 4 is perspective view of a display device and a first device, according to embodiments of the present invention.

FIG. 4 is perspective view of display device and a first device, according to embodiments of the present invention. In the present exemplary embodiment, the first device 130 is shown as STB, which connected to the display device 120. The first device 130 is configured to output image signals to the display device 120, which is shown displaying a listing of VOD assets 300 available to the subscriber account. The VOD asset 305 corresponding to the selection data received by the first device 130 is shown selected or bookmarked on the display device 120.

Figure 5:
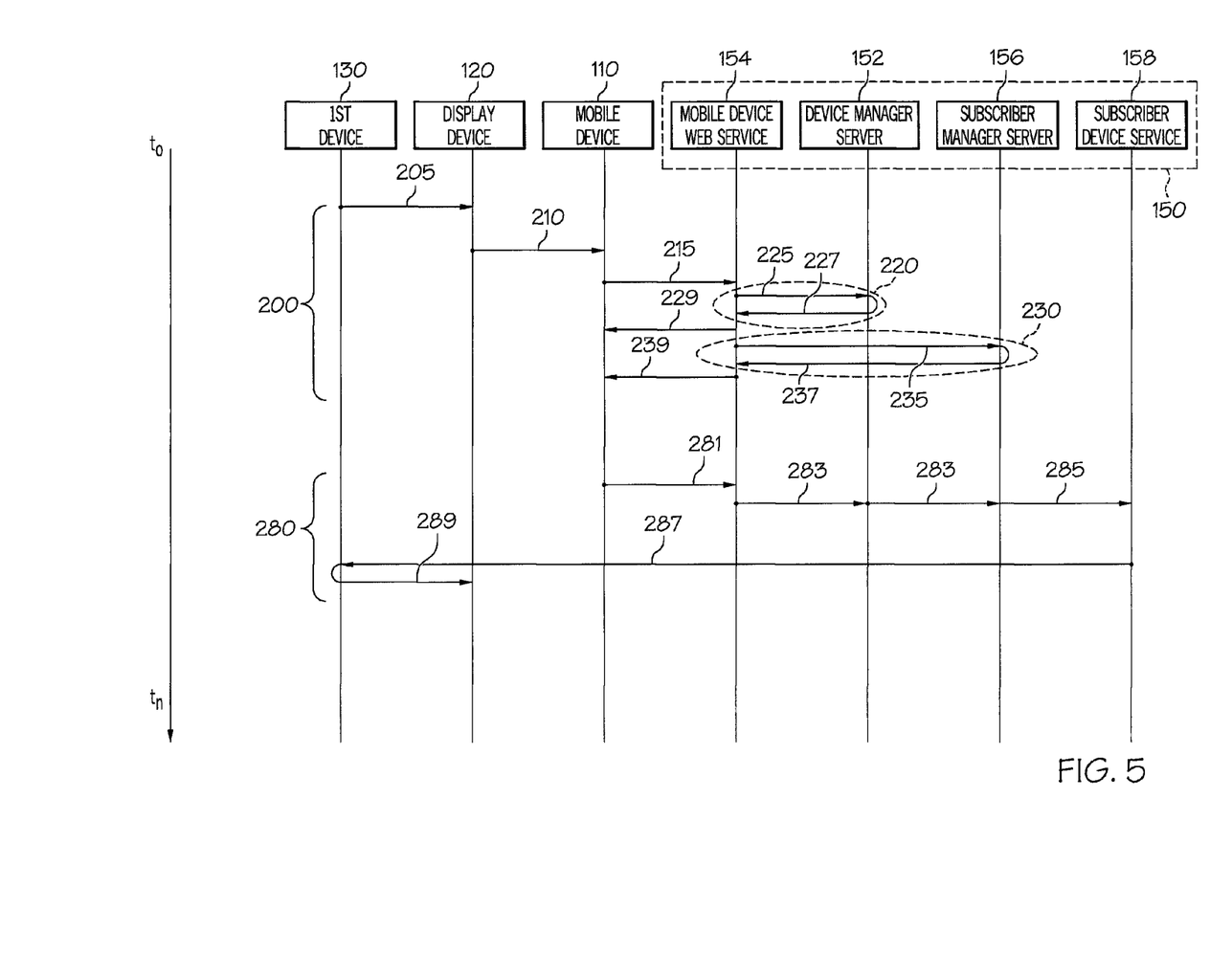
FIG. 5 is a sequence diagram that illustrates a method for associating a mobile electronic device with a preexisting subscriber account using a matrix barcode image, according to other embodiments of the present invention.
Figure 6:
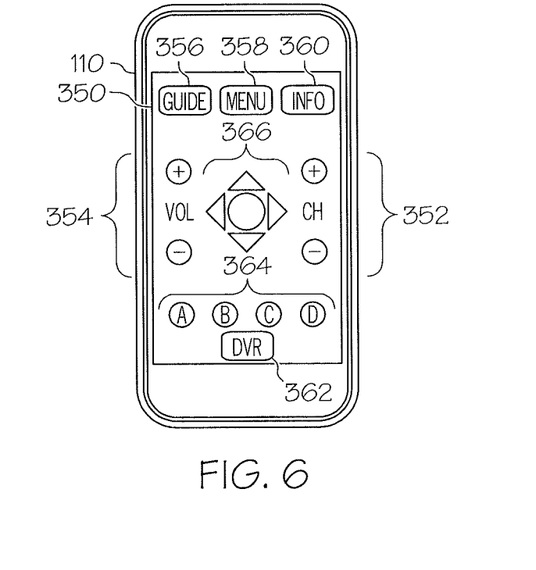
FIG. 6 is a front view of a mobile electronic device, according to other embodiments of the present invention.

FIG. 5 is a sequence diagram that illustrates a method for associating a mobile electronic device with preexisting subscriber account using a matrix barcode image, according to other embodiments of the present invention, and FIG. 6 is a front view of a mobile electronic device, according to other embodiments of the present invention.

The sequence diagram of FIG. 5 illustrates the exemplary method (200) for associating the mobile electronic device 110 with the subscriber's account as shown in FIG. 2 and described above. Accordingly, a description of the process (200) is not repeated below. The sequence diagram of FIG. 5 also illustrates an exemplary method for controlling other devices, such as the first device 130, associated with the subscriber's account using the mobile electronic device 110.

The mobile electronic device 110 can be loaded with a program that includes executable instructions for performing the methods and processes described in connection with the sequence diagram of FIG. 5. For example, the mobile electronic device 110 can be loaded with a graphical user interface (GUI) program that configures the mobile electronic device into a remote control device capable of controlling the various functions of the display device 120 and/or the first device 130, such as, channel tuning, volume control, electronic program guide access, digital video recorder access and VOD access.

The mobile electronic device is shown displaying a GUI 350 for controlling the various functions of the display device 120 and/or the first device 130. The GUI 350 includes buttons for channel tuning 352, volume control 354, electronic program guide access 356, menu access 358, information access 360, digital video recorder access 362, options 364, and navigation and selection 366.

In response to a subscriber or user selection of a control function displayed on the GUI 350, the mobile electronic device 110 transmits a message including selection data to mobile device web service 154 of the media services system 150 (281). The mobile device web service 154 relays the message to the device manager server 152 and/or the subscriber manager server 156 for authentication and processing (283). Following authentication and processing (285), the subscriber device service 158 transmits a message including the selection data to the first device 130 (287), which can performing a function corresponding to the selection data (289).

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A computerized method for associating a mobile electronic device with a preexisting subscriber account, the method comprising:

capturing, by a mobile electronic device, a matrix barcode image presented on a display by a first device, the matrix barcode image encoded with first device identification data that identifies the first device, the first device identification data being associated with a preexisting subscriber account stored in a subscriber database;

extracting, by the mobile electronic device, the first device identification data from the matrix barcode image;

obtaining, by the mobile electronic device, mobile device identification data that identifies the mobile electronic device; and transmitting a message, by the mobile electronic device, to a device manager server, the message including the first device identification data, the mobile device identification data and a request to associate the mobile device identification data with the preexisting subscriber account associated with the first device identification data.

2. The computerized method of claim 1, wherein the matrix barcode image is further encoded with a uniform resource locator (URL) identifying web services of the device manager server, the method further comprising:

extracting, by the mobile electronic device, the first device identification data and the URL from the matrix barcode image; and transmitting the message, by the mobile electronic device, to the web services of the device manage server at the URL extracted from the matrix barcode image.

3. The computerized method of claim 1, wherein the device manager server is configured to update the subscriber database, the method further comprising:

receiving, by the device manager server, the message transmitted by the mobile electronic device; and searching the subscriber database for the preexisting subscriber account associated with the first device identification data, and updating the preexisting subscriber account to include the mobile device identification data.

4. The computerized method of claim 1, wherein the matrix barcode image is further encoded with subscriber account information.

5. The computerized method of claim 1, wherein the first device is a set top box connected to the display.

6. The computerized method of claim 1, wherein the first device is an internet-connected television.

7. The computerized method of claim 1, wherein the first device is a mobile computer device having an integrated display.

8. The method of claim 1, wherein the mobile electronic device includes one selected from the group consisting of: a mobile phone, a portable media player, a tablet computer, and a personal digital assistant.

9. The method of claim 1, wherein the first device identification data includes at least one selected from the group consisting of: a MAC address of the first device, an IP address of the first device, a serial number of the first device, and a geographic location of the first device.

10. The method of claim 1, wherein the mobile device identification data includes at least one selected from the group consisting of: a MAC address, a network address, an electronic serial number (ESN), an international mobile equipment identity (IMEI) number, a globally unique identifier (GUID), and a telephone number.

11. A non-transitory computer readable media comprising computer executable instructions for performing a method for associating a mobile electronic device with a preexisting subscriber account, the instructions being executable to cause the mobile electronic device to:
capture a matrix barcode image presented on a display by a first device, the matrix barcode image encoded with first device identification data that identifies the first device, the first device identification data being associated with a preexisting subscriber account stored in a subscriber database;
extract the first device identification data from the matrix barcode image;
obtain mobile device identification data that identifies the mobile electronic device; and
transmit a message to a device manager server, the message including the first device identification data, the mobile device identification data and a request to associate the mobile device identification data with the preexisting subscriber account associated with the first device identification data.

12. The non-transitory computer readable media of claim 11, wherein the matrix barcode image is further encoded with a uniform resource locator (URL) identifying web services of the device manager server, the non-transitory computer readable media further comprising executable instructions to cause the mobile electronic device to:
extract the first device identification data and the URL from the matrix barcode image; and
transmit the message to the web services of the device manage server at the URL extracted from the matrix barcode image.

13. The non-transitory computer readable media of claim 11, wherein the first device is a set top box connected to the display.

14. The non-transitory computer readable media of claim 11, wherein the first device is an internet-connected television.

15. The non-transitory computer readable media of claim 11, wherein the first device is a mobile computer device having an integrated display.

16. The non-transitory computer readable media of claim 11, wherein the mobile electronic device includes one selected from the group consisting of: a mobile phone, a portable media player, a tablet computer, and a personal digital assistant.

17. The non-transitory computer readable media of claim 11, wherein the first device identification data includes at least one selected from the group consisting of: a MAC address of the first device, an IP address of the first device, a serial number of the first device, and a geographic location of the first device.

18. The non-transitory computer readable media of claim 11, wherein the mobile device identification data includes at least one selected from the group consisting of: a MAC address, an network address, an electronic serial number (ESN), an international mobile equipment identity (IMEI) number, a globally unique identifier (GUID), and a telephone number.

19. A computerized method for associating a mobile electronic device with a preexisting subscriber account, the method comprising:
providing access to a non-transitory computer readable media including computer executable instructions for performing a method for associating a mobile electronic device with a preexisting subscriber account, the instructions being executable to cause the mobile electronic device to:
capture a matrix barcode image presented on a display by a first device, the matrix barcode image encoded with first device identification data that identifies the first device, the first device identification data being associated with a preexisting subscriber account stored in a subscriber database;
extract the first device identification data from the matrix barcode image;
obtain mobile device identification data that identifies the mobile electronic device; and
transmit a message to a device manager server, the message including the first device identification data, the mobile device identification data and a request to associate the mobile device identification data with the preexisting subscriber account associated with the first device identification data; and
loading the executable instructions on to the mobile electronic device.

20. A mobile electronic device comprising:
an image capture device configured to capture a matrix barcode image presented on a display by a first device, the matrix barcode image encoded with first device identification data that identifies the first device, the first device identification data being associated with a preexisting subscriber account stored in a service provider database; and
a processor in communication with the image capture device, the processor configured to:
extract the first device identification data from the matrix barcode image;
obtain mobile device identification data that identifies the mobile electronic device; and
transmit a message to a device manager server, the message including the first device identification data, the mobile device identification data and a request to associate the mobile device identification data with the preexisting subscriber account associated with the first device identification data.

* * * * *